United States Patent
Vigen et al.

(10) Patent No.: US 11,009,608 B2
(45) Date of Patent: May 18, 2021

(54) GNSS AUTHENTICATION METHOD

(71) Applicant: Fugro N.V., Leidschendam (NL)

(72) Inventors: Erik Vigen, Oslo (NO); Kristin Keltner Støme, Oslo (NO); Bendik Bjorklid Mjaaland, Oslo (NO)

(73) Assignee: FUGRO N.V.

( * ) Notice: Subject to any disclaimer, the term of this patent is extended or adjusted under 35 U.S.C. 154(b) by 196 days.

(21) Appl. No.: 16/093,746

(22) PCT Filed: Apr. 25, 2017

(86) PCT No.: PCT/NL2017/050266
§ 371 (c)(1),
(2) Date: Oct. 15, 2018

(87) PCT Pub. No.: WO2017/188813
PCT Pub. Date: Nov. 2, 2017

(65) Prior Publication Data
US 2019/0120970 A1    Apr. 25, 2019

(30) Foreign Application Priority Data
Apr. 25, 2016   (NL) ..................... 2016671

(51) Int. Cl.
*G01S 19/21*   (2010.01)
*G01S 19/03*   (2010.01)
(Continued)

(52) U.S. Cl.
CPC ............ *G01S 19/215* (2013.01); *G01S 19/03* (2013.01); *H04K 3/25* (2013.01); *H04K 3/65* (2013.01);
(Continued)

(58) Field of Classification Search
CPC ......... G01S 19/03; G01S 19/215; H04K 3/25; H04K 3/65; H04K 3/90; H04L 9/0643; H04L 9/3247
See application file for complete search history.

(56) References Cited

U.S. PATENT DOCUMENTS 5,786,773 A    7/1998   Murphy
7,194,620 B1   3/2007   Hayes
(Continued)

FOREIGN PATENT DOCUMENTS

EP    2583117 B1   4/2013
EP    2770340 A1   8/2014
(Continued)

OTHER PUBLICATIONS

International Search Report and Written Opinion; PCT Application No. PCT/NL2017/050266; dated Sep. 4, 2017.

*Primary Examiner* — Dao L Phan
(74) *Attorney, Agent, or Firm* — Polsinelli PC (57) ABSTRACT

A method for authentication of GNSS messages by an authentication transmitter apparatus comprising a reference receiver, an authentication server and an authentication transmitter. The method comprises: receiving, by the reference receiver, a plurality of navigation messages from a plurality of GNSS satellites; hashing, by the authentication server, the navigation messages to create a plurality of hashed messages; creating, by the authentication server, a table comprising the plurality of hashed messages; signing, by the authentication server, the table to create a signed table comprising the hashed messages and a cryptographic signature, and transmitting, by the authentication transmitter, the signed table to an authentication receiver apparatus.

20 Claims, 5 Drawing Sheets

(51) Int. Cl.
  *H04K 3/00* (2006.01)
  *H04L 9/06* (2006.01)
  *H04L 9/32* (2006.01)

(52) U.S. Cl.
  CPC .............. *H04K 3/90* (2013.01); *H04L 9/0643* (2013.01); *H04L 9/3247* (2013.01)

(56) References Cited

U.S. PATENT DOCUMENTS

| | | |
|---|---|---|
| 2011/0068971 A1 | 3/2011 | Kusyk |
| 2011/0138192 A1* | 6/2011 | Kocher ................. H04L 9/3247 713/189 |
| 2011/0227787 A1 | 9/2011 | Gum et al. |
| 2015/0309179 A1 | 10/2015 | Jantz et al. |

FOREIGN PATENT DOCUMENTS

| | | |
|---|---|---|
| WO | 2011157554 A1 | 12/2011 |
| WO | 2017188813 A1 | 11/2017 |

* cited by examiner

GNSS AUTHENTICATION METHOD

TECHNICAL FIELD

The invention relates to methods, apparatuses and a system for securely authenticating global navigation satellite system messages using cryptography.

BACKGROUND ART

A global navigation satellite system (GNSS) is a system of satellites that can be used for determining the geographic location of a mobile receiver with respect to the earth. Current GNSS include GPS, Galileo, GLONASS and BeiDou.

Satellite navigation systems provide navigation for which security and integrity is of outmost importance. The position, navigation and time (PNT) information obtained by the receivers must be reliable. However, problems may be encountered when trying to provide a receiver with information. First, the signals must arrive at the receivers with an acceptable quality level, which is already a challenge due to the multiple factors that affect the satellite communication link. A major threat is signal interference that may be natural, incidental or deliberate and that can degrade the signal observed by the receiver. But even if a signal is received with a sufficiently good quality in order for the information to be decoded and used, it is possible that said signal is not the signal originally sent by the satellite. GNSS signals are vulnerable to said interference that may be inserted to perform different types of attacks, such as jamming, spoofing, and meaconing. Jamming relates to deliberately interfering in a communication by emitting radio noise in the frequency band so that the receiver is not able to track the signal. Spoofing relates to broadcasting counterfeit signals that the receiver will interpret as genuine GNSS signals and so will deceive the receiver, and meaconing relates to intercepting and retransmitting genuine signals with delays aiming at deceiving the receiver to establish false PNT. One important feature to reduce the vulnerability of GNSS receivers to such attacks is to provide authentication mechanisms that allow verification of the authenticity of received GNSS messages.

A GNSS may also be augmented with corrections to the satellite position and the clock offset as given by the satellite navigation message. This augmentation aims at enhancing the accuracy of the PNT solution, but the correction messages may be subject to similar attacks as the navigation messages and have need for authentication, too.

European patent EP2583117B1 presents a high-level description of standalone signal-in-space authentication, which allows a GNSS receiver to authenticate radio navigation signals that arrive at the receiver (which are to be used for computing positioning information), to verify that these GNSS signals actually originate and are received directly from a set of GNSS satellites instead of from jamming/spoofing/meaconing entities.

Message authentication may be performed using various types of cryptographic protocols. These protocols typically operate based on signatures, which have to be transmitted together with the messages and thus pose a considerable increase in the needed bandwidth, which is a crucial parameter.

Several authentication service approaches have been proposed in the Galileo Open Service and Commercial Service. Exemplary proposals use a time efficient loss tolerant authentication (TESLA) symmetric cryptographic protocol. They provide a bandwidth efficient authentication mechanism, but verification of the signatures needs to take place at the receiver a certain time after it was transmitted.

It would be desirable to provide methods, apparatuses, and systems for authentication of GNSS messages by use of cryptography, which allow reliable authentication of GNSS message data from all visible GNSS satellites, even when transmission capacity (bandwidth) of the communication channel is relatively small.

SUMMARY OF INVENTION

Therefore, according to a first aspect, there is provided a method for authentication of GNSS messages by an authentication transmitter apparatus comprising at least one reference receiver, an authentication server, and a transmitting unit. The method comprises: receiving, by the at least one reference receiver, a plurality of navigation messages from a plurality of GNSS satellites; hashing, by the authentication server, the navigation messages to create a plurality of hashed messages; creating, by the authentication server, a table comprising the plurality of hashed messages; signing, by the authentication server, the table to create a signed table comprising the hashed messages and a cryptographic signature, and transmitting, by the transmitting unit, the signed table to an authentication receiver apparatus.

The present invention advantageously provides a method that efficiently deals with bandwidth constraints in satellite navigation and augmentation systems. Instead of signing each message individually, which would considerably increase bandwidth consumption, secure "hash IDs" of messages are added to a table, and the table is then signed. Since signatures are relatively large compared to other message data, a reduction in the number of necessary signatures will reduce communication overhead. The present invention efficiently transmits the hash table over an independent channel such as a geostationary communication satellite broadcast channel. Any communication channel available may be used, such as the internet or a cellular network. It is the bandwidth of this channel that may be the bottleneck for technical or economic reasons, as is the case with satellite communication. When a communication channel is used for this purpose or for sending correction information it is often referred to as an augmentation system. The proposed method thus provides a reliable GNSS and augmentation message authentication mechanism with a high bandwidth efficiency.

Throughout the description, the term "hashing" should be broadly construed as comprising any irreversible transformation that maps input data blocks onto output data blocks of reduced sizes. This is, even though the description refers to hashing as the applied function, it would be evident to a person skilled in the art that other similar cyphering functions can be used in the methods and apparatuses of the present invention such as checksums, check digits, fingerprints, randomization functions, ciphers or a combination thereof without departing from the scope of the present invention.

According to an embodiment of the invention, the at least one reference receiver is in signal communication with and/or formed by a global network of GNSS receivers that are configured to receive the navigation messages from the plurality of GNSS satellites. The at least one reference receiver may be formed by or configured to communicate with a network of GNSS receivers that are spread in different locations over the earth. The network of GNSS receivers may include at least two receivers. The larger the number of GNSS receivers that form the network, the larger the amount of information that can be received. This may yield an increased (accuracy) reliability and robustness of the process to acquire the authentic messages. According to a further embodiment, the network of GNSS receivers comprises between forty and sixty receivers, for example a network of forty-five GNSS receivers spread over the earth could provide sufficient coverage. By relying on a global network of GNSS receivers, it becomes impractical that an attack can be successfully performed, because an adversary would need to do a synchronized attack at multiple GNSS receiver sites and intercept messages from the specific GNSS satellites from which the global GNSS receiver network receives messages and relays to the authentication transmitter apparatus.

The at least one reference receiver may be in signal communication with or formed by a network of GNSS receivers distributed over a large region. The said region may comprise more than one continent. This may be required to have continuous observability of all GNSS satellites from the GNSS receiver network, and the large physical distances between sites increase the complexity required to do a successful spoofing.

According to another embodiment, the method further comprises, after receiving the navigation messages, validating the navigation messages.

According to another embodiment, validating is performed by checking that a received navigation message allegedly coming from a specific GNSS satellite is identical at all or most of the GNSS receivers from the global network of GNSS receivers.

The authentication server may therefore be configured to validate authenticity and provide digitally signed hashes to received messages. The authentication server may be a validation and digital signature server that applies the cryptographic protocol to the received messages.

According to an embodiment, transmitting the signed table involves transmission via at least one geostationary satellite.

According to another embodiment, the authentication receiver apparatus is located within the field of coverage of the geostationary satellite. The link between the authentication transmitter apparatus and the authentication receiver apparatus may therefore be a geostationary satellite link, but it may be another type of link, such as a computer network like the internet.

According to another embodiment of the invention, the method further comprises: receiving a plurality of GNSS correction messages from at least one correction augmentation server; hashing, by the authentication server, the correction messages to create a plurality of hashed messages; creating, by the authentication server, a table comprising the plurality of truncated hashed messages; signing, by the authentication server, the table to create a signed table comprising the truncated hashed messages and a cryptographic signature, and transmitting, by the transmitting unit, the signed table to an authentication receiver apparatus.

Besides navigation messages, the authentication transmitter apparatus may receive augmentation information or correction information from a correction augmentation server specialized in calculating corrections and/or amendments to the GNSS navigation messages. This augmentation information is additional information aimed at improving reliability and accuracy. According to an embodiment of the invention, the authentication method may also be applied to correction messages. The correction augmentation server may be a trusted server and therefore a secure transfer of information to the authentication transmitter apparatus may be provided. Further validation may thus not be required. These correction messages may be received by the authentication server directly from the correction augmentation server and not through the network of GNSS satellites. This is, in a further embodiment, the authentication server may be provided with a receiver unit so that these correction messages may be received directly from the correction augmentation server by the authentication server.

According to a further embodiment of the invention, the method further comprises truncating the hashed messages so that the hashed messages in the signed table are truncated hashes with a size of a specific number of bits. In addition to hashing the navigation or similarly the correction messages, a truncation function may be applied to the hashed messages so that their size is reduced to a manageable size, while being still long enough to provide an acceptable security level in terms of collision resistance. The truncation level may depend on the desired balance between bandwidth and security level. For example, the size of the truncated messages may be between fifty and seventy bits, e.g. one of fifty-eight, sixty-four, and sixty-eight bits.

According to an embodiment, the cryptographic signature is implemented with a private key using an asymmetric cryptographic algorithm, preferably an elliptic curve digital signature algorithm, ECDSA. This algorithm provides a fast performance and a high level of security without the need for long signatures and keys. However, it should be noted that another suitable cryptographic algorithm may be used, such as DSA.

According to a second aspect, there is provided a method for authentication of global navigation satellite system, GNSS, messages by an authentication receiver apparatus. The method according to this aspect comprises: receiving a plurality of navigation messages from a plurality of GNSS satellites; receiving a signed table including hashed messages and a signature from an authentication transmitter apparatus; verifying the signed table using the received signature; hashing the navigation messages received from the plurality of GNSS satellites to create a plurality of further hashed messages; and comparing the further hashed messages with the verified and hashed messages, to assess an authenticity of the navigation messages.

An authentication receiver apparatus that wishes to receive navigation information may receive the table and the signature transmitted by the authentication transmitter apparatus and may verify the table. The authentication receiver apparatus may furthermore receive navigation messages directly from the plurality of GNSS satellites, perform the same hashing operation as the one performed by the authentication transmitter apparatus to obtain further hashed messages, and compare the messages in the verified table with the further hashed messages to determine authenticity of the navigation messages. The authentication receiver apparatus may be onboard a ship that is located off-shore and wishes to receive authentication information for navigation or docking. The authentication receiver apparatus may have a subscription or a prearranged agreement with the authentication transmitter apparatus, such that the authentication receiver apparatus is beforehand provisioned with the hash function used by the authentication transmitter apparatus, with a public key corresponding to the private key used by the authentication transmitter apparatus, and with further necessary information.

According to an embodiment, the authentication receiver apparatus receives the navigation messages from a different source than the GNSS satellite. Under specific conditions, the authentication receiver apparatus may receive GNSS navigation messages from a different source than the GNSS satellites. These navigation messages are also known as assisted GNSS (AGNSS) messages. A GNSS receiver may receive navigation messages from the GNSS satellites, and send the navigation messages to the authentication receiver apparatus so that the authentication receiver apparatus does not need to download the navigation messages from the satellite. This operation may aid the authentication receiver apparatus when operating in difficult environments where it may be difficult to observe unbroken signals from the GNSS satellites for the duration of the message. This operation may also be used to efficiently speed up the cold start of the authentication receiver apparatus.

The navigation messages received via the intermediate GNSS receiver may be authenticated using the same method as if they were received directly from the GNSS satellites.

Further embodiments of the method according to this second aspect are discussed below. These embodiments yield advantages and effects as described above with reference to the first aspect.

According to an embodiment, receiving the signed table of hashed messages and the signature involves reception via at least one geostationary satellite. According to a further embodiment, the authentication receiver apparatus is located within the field of coverage of the geostationary satellite.

According to an embodiment, the method further comprises: receiving a plurality of GNSS correction messages from at least one correction augmentation server; receiving a signed table including hashed GNSS correction messages and a signature from an authentication transmitter apparatus; verifying the signed table using the received signature; hashing the correction messages received from the plurality of GNSS satellites to create a plurality of further hashed messages; and comparing the further hashed messages with the verified and hashed messages, to assess the authenticity of the correction messages.

According to a method embodiment, the hashed messages in the signed table are truncated hashed messages with a size of a specific integer number of bits. This method embodiment comprises, after hashing the navigation or correction messages received from the plurality of GNSS satellites, truncating the further hashed messages into further truncated hashed messages having a size equal to the specific integer number of bits.

According to a further embodiment, the size of the further truncated hashed messages may be varied, preferably between fifty and seventy bits. More preferably, the truncation is varied between one of fifty-eight bits, sixty-four bits, and sixty-eight bits.

According to an embodiment, the verification of the signed table is implemented with the received signature and a public key using an asymmetric cryptographic algorithm.

According to a third aspect, there is provided an authentication transmitter apparatus for authentication of GNSS messages. The authentication transmitter apparatus comprises: at least one reference receiver configured to receive a plurality of navigation messages from a plurality of GNSS satellites; an authentication server configured to hash the navigation messages, to create a table with the plurality of hashed messages, and to sign the table using a cryptographic signature to create a signed table with the hashed messages and the signature; and a transmitting unit configured to transmit the signed table to an authentication receiver apparatus.

The authentication transmitter apparatus is configured to execute at least one method embodiment in accordance with the first aspect of the invention.

According to a fourth aspect, there is provided an authentication receiver apparatus for authenticating GNSS messages. The authentication receiver apparatus is configured to: receive a plurality of navigation messages from a plurality of GNSS satellites; receive a signed table including hashed messages and a signature from an authentication transmitter apparatus; verify the signed table using the received signature; hash the navigation messages received from the plurality of GNSS satellites to create a plurality of further hashed messages; and compare the further hashed messages with the verified and hashed messages, to assess the authenticity of the navigation messages.

The authentication receiver apparatus is configured to execute at least one method embodiment in accordance with the second aspect of the invention.

According to a fifth aspect, there is provided a system for authenticating GNSS messages, comprising: an authentication transmitter apparatus configured to receive a plurality of navigation messages from a plurality of GNSS satellites, to hash the navigation messages, to create a table with the plurality of hashed messages, to sign the table using a cryptographic signature to create a signed table with the hashed messages and the signature, and to transmit the signed table to an authentication receiver apparatus; and an authentication receiver apparatus configured to receive a plurality of navigation messages from a plurality of GNSS satellites, to receive a signed table including hashed messages and a signature from an authentication transmitter apparatus, to verify the signed table using the received signature; to hash the navigation messages received from the plurality of GNSS satellites to create a plurality of further hashed messages, and compare the further hashed messages received from the plurality of GNSS satellites with the verified and hashed messages, to assess an authenticity of the navigation messages.

Preferably, components in the proposed methods, apparatuses, and system are configured to operate in real time or near real time. It should, however, be understood that various parts of the methods may also be executed in an off-line mode.

BRIEF DESCRIPTION OF DRAWINGS

Embodiments will now be described, by way of example only, with reference to the accompanying schematic drawings in which corresponding reference symbols indicate corresponding parts. In the drawings, like numerals designate like elements. Furthermore, multiple instances of an element may each include separate letters appended to the element number. For example two instances of a particular element "20" may be labeled as "20*a*" and "20*b*". In that case, the element label may be used without an appended letter (e.g. "20") to generally refer to every instance of the element, the element label will include an appended letter (e.g. "20*a*") to refer to a specific instance of the element, or the element label will include an index i (e.g. "20*i*") to refer to an unspecified instance of the element.

The figures are meant for illustrative purposes only, and do not serve as restriction of the scope or the protection as laid down by the claims.

DESCRIPTION OF EMBODIMENTS

The following is a description of exemplary embodiments of the invention, given by way of example only and with reference to the figures. It should be noted that throughout the description, the terms "authentication transmitter" and "authentication transmitter apparatus" will be used interchangeably. Similarly, "authentication receiver" and "authentication receiver apparatus" will be used interchangeably.

Figure 1:
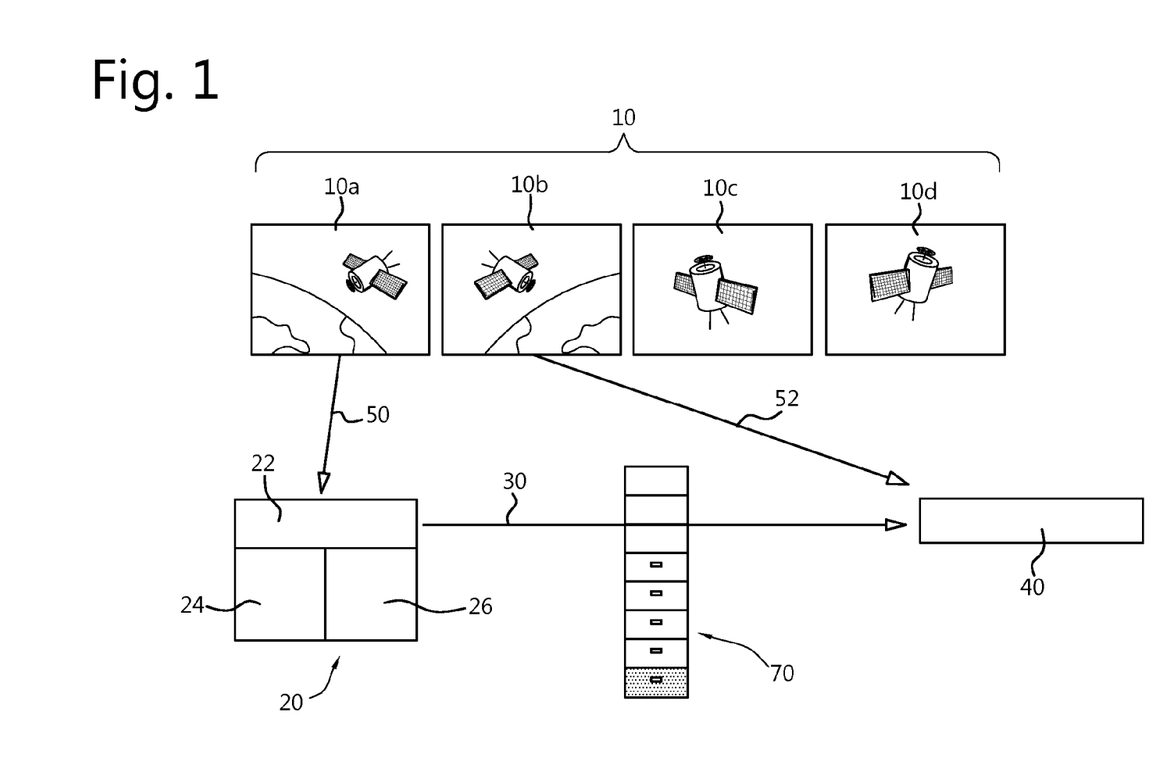
FIG. 1 schematically shows an overview of a system for authentication of GNSS messages according to an embodiment of the present invention.

FIG. 1 schematically shows an overview of a system for authenticating GNSS messages according to an embodiment. The authentication system comprises an authentication transmitter apparatus 20 and an authentication receiver apparatus 40. The authentication transmitter apparatus 20 and authentication receiver apparatus 40 are each configured to receive respective messages 50 or 52 from a plurality of GNSS satellites 10. These GNSS messages 50, 52 may be navigation messages that provide position, navigation and time information. Navigation messages 50 and 52 may be the same messages, and they may be received in the same transmission. Under difficult reception conditions, however, the authentication receiver apparatus 40 may not be able to receive the navigation messages 52 in the same transmission as the authentication transmitter apparatus receives the navigation messages 50. Nonetheless, the critical contents of the navigation messages may be transmitted over a longer period so that authentication may take place even if there is no direct time match. The authentication transmitter apparatus 20 and authentication receiver apparatus 40 may each further be configured to receive correction messages from a correction augmentation server. By way of example, this embodiment will be described with reference to navigation messages, but it is to be understood that the same mechanism may be applied to correction messages.

The authentication transmitter apparatus 20 is configured for receiving and authenticating GNSS messages 50, and comprises a reference receiver 22, an authentication server 24, and a transmitting unit 26. The reference receiver 22 is configured to receive the messages 50 from the GNSS satellites 10. The authentication server 24 is configured to hash and cryptographically sign the GNSS messages 50, in order to create a signed table 70 including the hashed messages and a signature. The transmitting unit 26 is configured to transmit the signed table 70 to the authentication receiver apparatus 40.

After the authentication transmitter apparatus 20 has received the navigation messages 50, the acquired navigation messages may be validated to ensure they are trustable before performing the hashing and signing operations. A global network of GNSS receivers may be part of the reference receiver 22, or the reference receiver may be in communication with the global network of GNSS receivers. The validation may be carried out by checking not only one received message, but by checking that, for a given GNSS satellite, the same message is observed at all receiver network sites in view of the satellite.

After the navigation messages 50 have been received and validated, the authentication server 24 of the authentication transmitter apparatus 20 may perform hashing of the messages, truncation of the hashed messages, and mapping of the truncated hashed messages to a table. These truncated hashed messages are hash ID messages (HIDs) that identify the messages. The authentication transmitter apparatus 20 may then sign the table and transmit the resulting signed table 70 with the signature to the authentication receiver apparatus 40.

The authentication transmitter apparatus 20 may transmit tables 70 with signatures via broadcast, so that they can be received by receivers that wish to obtain the authentication messages. The authentication transmitter apparatus 20 may transmit tables 70 and signatures periodically, such as every one minute, two minutes or any other suitable period, or it may transmit tables 70 at specific moments, such as when it receives a request.

On the receiver side, the authentication receiver apparatus 40 may receive data from the authentication transmitter apparatus 20. In particular, the authentication receiver apparatus 40 is configured for receiving signed tables 70 including the hashed messages and the signature from the authentication transmitter apparatus 20. The authentication receiver apparatus is further configured to verify the signed table using the received signature. The authentication receiver apparatus may then store the verified and hashed messages.

The authentication receiver apparatus 40 is also configured to receive messages 52 directly from the plurality of GNSS satellites 10. The authentication receiver apparatus 40 may then perform the same type of hash operations on the received GNSS messages 52 as the hash operations performed by the authentication transmitter apparatus 20, in order to create further hashed messages. The authentication receiver apparatus 40 may perform the same type of truncation operations as the authentication transmitter apparatus 20 on the further hashed messages, to create further truncated hashed messages. The authentication receiver apparatus 40 may then compare the further truncated hashed messages with the verified and hashed messages, to allow the authentication receiver apparatus 40 to assess whether the messages 52 received from the GNSS satellites 10 are authentic and trustworthy, as will be further explained with reference to FIGS. 2 and 3.

Not all GNSS satellites 10 may be simultaneously visible to the authentication receiver 40 at any time. Although the authentication receiver 40 may receive tables 70 and signatures from the authentication transmitter apparatus 20 periodically, verification of the messages by the authentication receiver 40 may take place when the authentication receiver 40 has received the corresponding navigation messages 52 from the GNSS satellites 10. Even though the authentication receiver apparatus may repeatedly receive tables with hashed messages, the authentication receiver apparatus may only want to use these hashed messages when it receives the navigation messages from the GNSS satellites.

Authentication of the navigation messages could be done by transmitting a signature for each of them, but that would correspond to considerable bandwidth consumption. A direct and efficient approach for saving bandwidth would be to concatenate a plurality of messages, and sign them together. For this, the receiver may need to have prior access to all of these messages. In practice, this condition may be difficult to meet, as the likelihood that all satellites are visible at the same time is low. The visibility problem could be alleviated by simply sending the subset of messages the receiver is able to see. However, signal obstacles could still prevent a receiver from tracking a satellite. A solution for this would be using hash IDs so that the receiver does not need to have any specific set of navigation messages.

Therefore, according to an embodiment of the present invention, an identifier (the hash ID, HID) may be created by the authentication transmitter apparatus 20 for each message, using a one-way hash function. The table of identifiers is smaller than all the full messages combined so it can be signed and distributed to many receivers, achieving the desired effect of having one signature cover many messages, and the authentication receiver 40 can verify the navigation messages needed without requiring to have all those represented in the hash table. When the authentication receiver apparatus receives GNSS navigation messages, it may perform the hashing and truncating operations. When a signed table with truncated hash messages is received from the authentication transmitter apparatus, the authentication receiver apparatus may verify the table and store the truncated hash messages in another table. The authentication receiver apparatus may then individually compare the GNSS navigation messages with the verified and hashed messages to find a match. It is therefore not necessary that the authentication receiver apparatus receives all GNSS navigation messages corresponding to all the (truncated) hashed messages in a table in order to start the authentication.

In this exemplary system, the components are configured to operate in (near) real time: the broadcast by the authentication transmitter apparatus 20 may be performed in real time with respect to the data collection. Similarly, the authentication receiver apparatus 40 may perform the checks immediately after receiving the necessary information.

Figure 2:
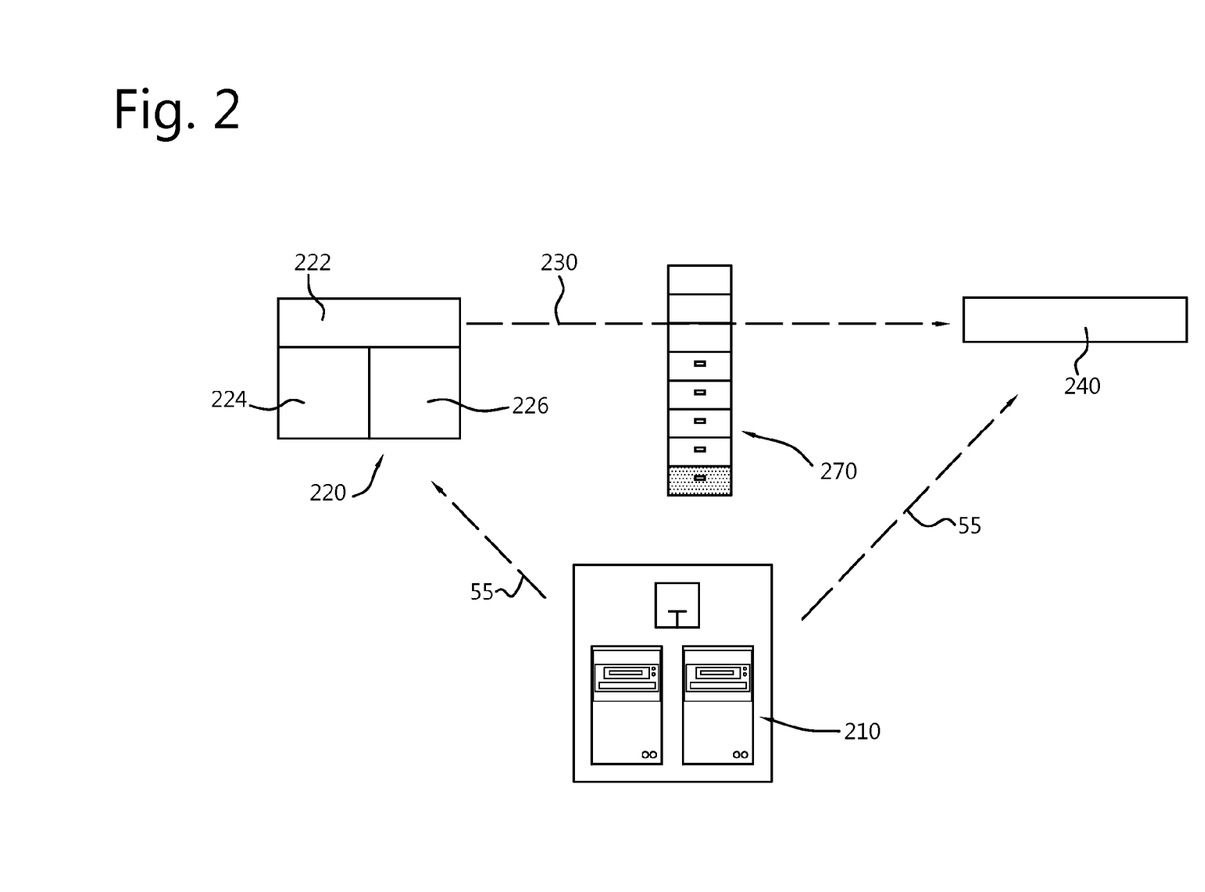
FIG. 2 illustrates an overview of a system for authentication of correction messages according to an embodiment of the present invention.

FIG. 2 illustrates an overview of a system for authentication of GNSS correction messages according to an embodiment of the present invention. For the discussion with reference to FIG. 2, like features with respect to FIG. 1 are designated with similar reference numerals preceded by 200, to distinguish the embodiments.

Besides GNSS navigation messages, the authentication transmitter apparatus 220 according to an embodiment of the invention may receive augmentation information or correction information in the form of correction messages 55 from at least one correction augmentation server 210 specialized in calculating corrections and/or amendments to the GNSS navigation messages. The correction information is additional information aimed at improving reliability and accuracy. According to an embodiment of the invention, the authentication method may also be applied to correction messages. The correction augmentation server 210 may be a trusted server and therefore a secure transfer of information to the authentication transmitter apparatus may be provided. Further validation may thus not be required.

After the authentication transmitter apparatus 220 has received the correction messages 55, it may perform similar operations to those performed with the GNSS navigation messages, as explained with reference to FIG. 1. This is, the authentication transmitter apparatus may perform hashing of the messages, truncation of the hashed messages, and mapping of the truncated hashed messages to a table. These truncated hashed messages are hash ID messages (HIDs) that identify the messages. The authentication transmitter apparatus 220 may then sign the table and transmit the resulting signed table 270 with the signature to the authentication receiver apparatus 240. It should be noted that the hash and signature algorithms applied for the correction messages may be the same as those applied for the navigation messages, or they may be different.

On the receiver side, the authentication receiver apparatus 240 may receive data from the authentication transmitter apparatus 220. In particular, the authentication receiver apparatus 240 is configured for receiving signed tables 270 including the hashed messages and the signature from the authentication transmitter apparatus 220. The authentication receiver apparatus is further configured to verify the signed table using the received signature. The authentication receiver apparatus may then store the verified and hashed messages.

The authentication receiver apparatus 240 is also configured to receive messages 55 directly from the at least one correction augmentation server 210. The authentication receiver apparatus 240 may then perform the same type of hash operations on the received correction messages as the hash operations performed by the authentication transmitter apparatus 220, in order to create further hashed messages. The authentication receiver apparatus 240 may perform the same type of truncation operations as the authentication transmitter apparatus 220 on the further hashed messages, to create further truncated hashed messages. The authentication receiver apparatus 240 may then compare the further truncated hashed messages with the verified and hashed messages, to allow the authentication receiver apparatus 40 to assess whether the messages received from the correction augmentation server 210 are authentic and trustworthy.

Figure 3:
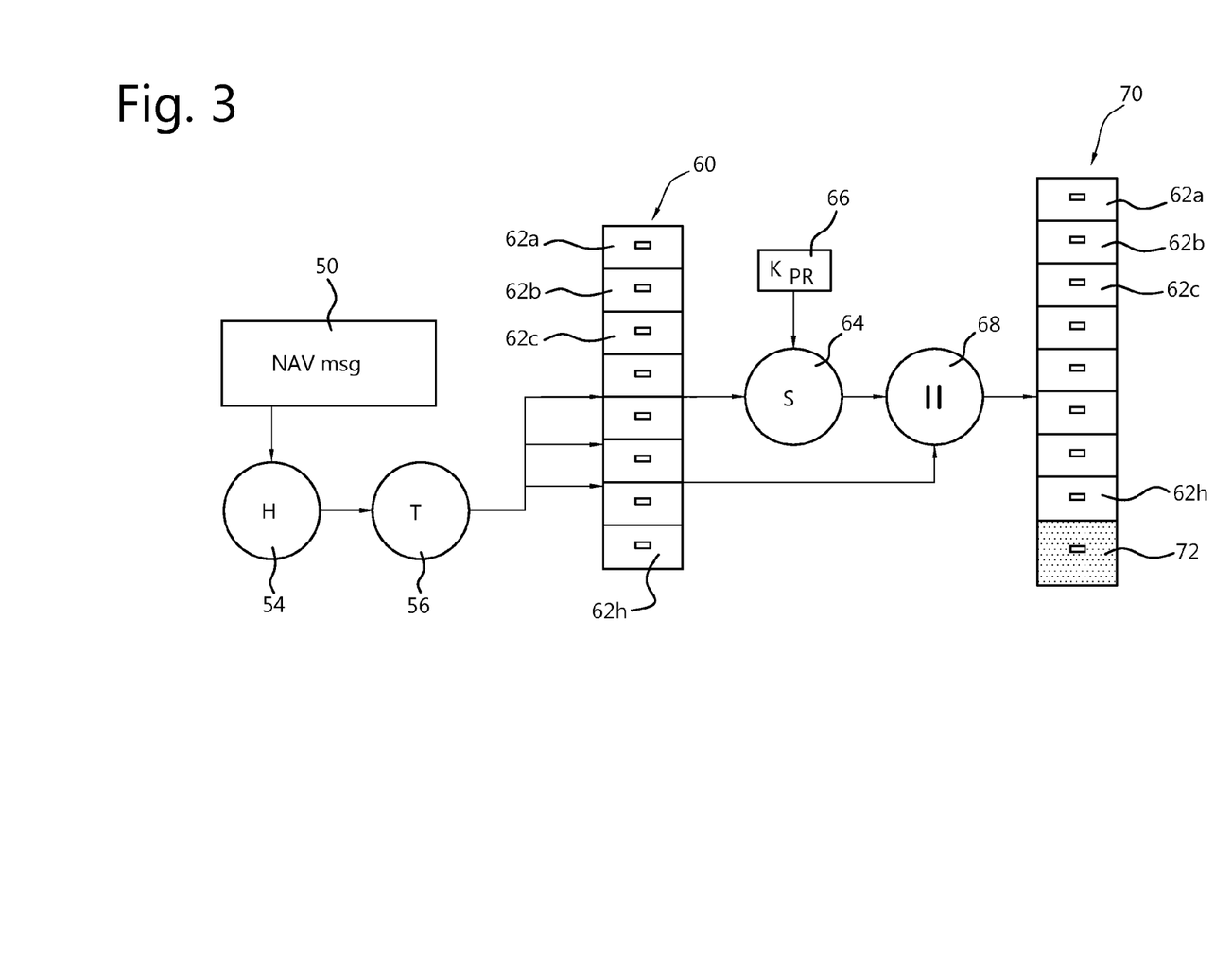
FIG. 3 shows a flow chart of a method performed by the authentication transmitter apparatus according to an embodiment of the present invention.

FIG. 3 shows a flow chart of a method performed by an authentication transmitter apparatus according to an embodiment of the present invention. This method embodiment is explained with reference to the exemplary authentication transmitter apparatus 20 and receiver apparatus 40 shown in FIG. 1. The method is also applied to the authentication transmitter apparatus 220 and receiver apparatus 240 shown in FIG. 2. Execution of the method should, however, not be considered limited to these exemplary transmitter and receiver embodiments.

According to this method embodiment, each received navigation message 50 received by the authentication transmitter may be input to a hash function 54. A non-invertible hash function 54 may be used to create a hash for each message to authenticate in for example the same epoch. The hash function 54 may be any standard function, such as one function of the SHA-2 family, for example the standardized SHA-256 hash function. As an alternative, several GNSS messages may be hashed together, but the authentication receiver apparatus may then need to receive all the messages corresponding to those messages hashed together before authentication can take place. It may therefore be more efficient to hash as few messages together as possible, more preferably to hash messages individually, so that the messages can be authenticated individually at the authentication receiver apparatus without broadcasting a signature for each message.

The hashed messages may be subsequently shortened or truncated 56 to a manageable length that still can ensure acceptable collision resistance. This truncation 56 can be done into a variable number of bits, depending on the desired level of security. A size of sixty-four bits for the truncated hash may provide a sufficient level of security. Adding or removing bits to the hash will affect the obtainable level of security. The hash size may therefore be flexible and dynamically changed over time. Different truncation schemes may be possible, for example truncation to fifty-eight bits or sixty-eight bits.

The resulting hashed messages 62, which as explained above may be truncated hashed messages, can be referred to as the message hash identifiers (HIDs), which uniquely identify each message. The hashing function 54 may therefore have two purposes: hashing and creating identification messages. In this example, the HIDs or hashed messages 62 are not individually signed. Here, the hashed messages 62 may be grouped and added to an unsigned table 60, and the table 60 may first be signed before being transmitted.

The criteria for grouping the messages 50 may be the expected or estimated location of the authentication receiver 40 that will receive the messages. The authentication transmitter apparatus 20 may have initial information about the (approximate) location of the authentication receiver 40. Depending on the location of the authentication receiver 40, it will be located within the coverage area of a specific subset of GNSS satellites 10. In an embodiment of the invention, the authentication transmitter apparatus may know where the authentication receiver apparatus is, and it can send navigation messages of only the GNSS satellites visible at the authentication receiver site. This may require a two-way communication and a message dedicated to a single authentication receiver apparatus.

In order to efficiently provide bandwidth saving, according to another embodiment of the invention, when broadcasting the hashed messages the authentication transmitter apparatus may not know where the authentication receiver apparatus is, but it may know that whoever is receiving the message is located within the known coverage area of a specific subset of communication satellites. The authentication transmitter apparatus can then make a table containing the hashed navigation messages from all the GNSS satellites that may be visible from anywhere inside that coverage area. In other words, the authentication transmitter apparatus can make a table containing the union of the hashed navigation messages from all the satellites visible by all possible users in the communication satellite broadcast coverage area.

According to embodiments, up to hundred twenty or more navigation messages 50 from up to hundred twenty or more GNSS satellites 10 may be received by the authentication transmitter apparatus 20. If, by way of example, the authentication receiver 40 is located within the coverage area of between fifteen and twenty-five of those satellites, preferably twenty of those satellites, a table with twenty messages from those twenty satellites can be created and sent to the authentication receiver 40.

According to an embodiment, if the messages are correction messages 55, the table of hashed messages may contain as many messages as there are correction messages for the epoch. By way of example, if messages 55 are arranged so that there is one correction message for each of the GNSS systems GPS, GLONASS, Galileo and BeiDou, the table 60 may contain four messages, each corresponding to a correction message from each GNSS system.

Once the table 60 with a group of suitable messages is created, it may be signed by being input to a signature function 64 using a cryptographic algorithm such as any of those known in the art. An asymmetric cryptographic algorithm may for example be used, and preferably a Digital Signature Algorithm (DSA) or Elliptic Curve Digital Signature Algorithm (ECDSA). The table 60 can thus be signed using a private key 66. The resulting signatures 72 used in these algorithms may have different sizes. If ECDSA is used, the size of the signature may depend on the elliptic curve used. A size that may provide a sufficiently secure signature is of three hundred and twenty bits, comprising two integers S and R with a size of hundred sixty bits each. The total size of data that is to be transmitted to authentication receivers 40 will be significantly reduced by only signing the entire table 60, instead of signing each individual message.

After applying the signature function 64, the signature 72 may be concatenated or merged 68 into a signed table 70. The signed table 70 with the signature 72 may then be transmitted to the authentication receiver 40.

When the authentication transmitter apparatus 20, or more specifically, the authentication server 24 of the authentication transmitter apparatus 20, generates the private key 66, it may also generate a public key corresponding to this private key 66. The public key should be available at the authentication receiver 40, so that the received navigation messages 52 (or correction messages 55) can be authenticated. Since the public and private keys may need to be renewed after a specific amount of time, the authentication transmitter apparatus 20 may transmit the public key via broadcast, because the part needed by the authentication receiver 40 is not secret. Alternatively or in addition, the public key may be updated by firmware updates or by other transfer methods.

Figure 4:
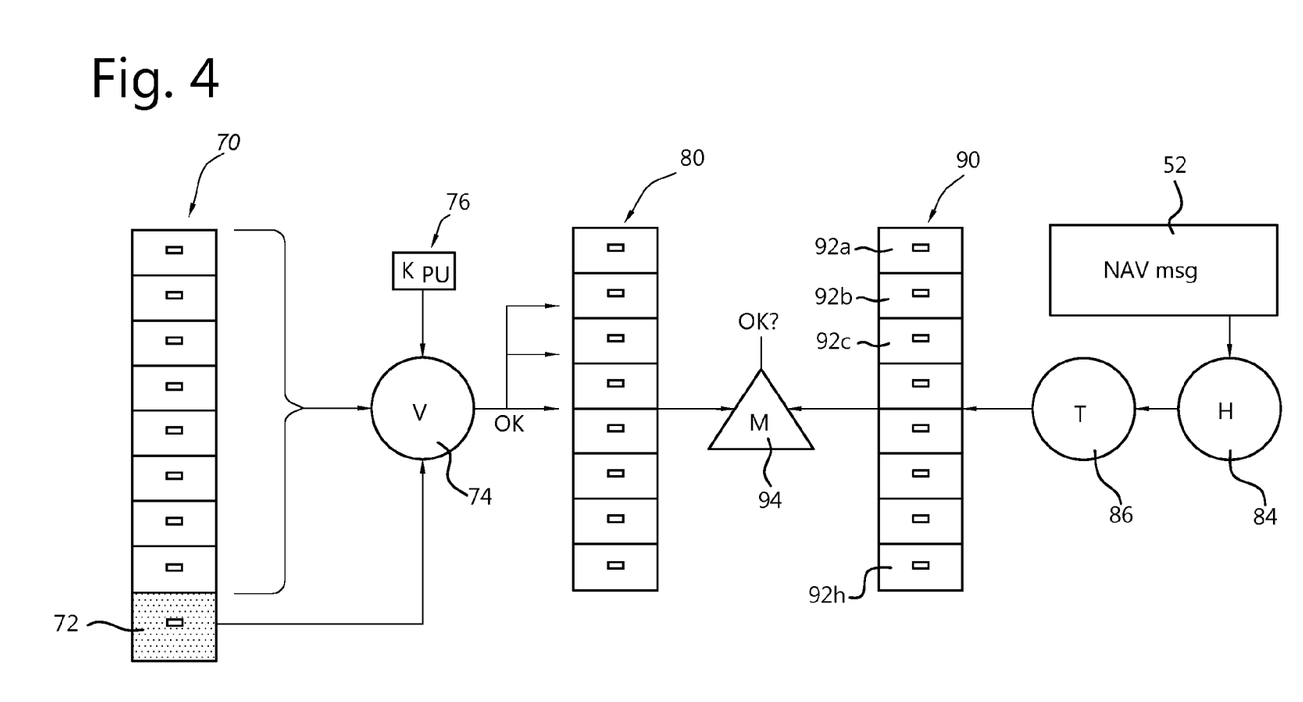
FIG. 4 shows a flow chart of a method performed by the authentication receiver apparatus according to an embodiment of the present invention.

FIG. 4 shows a flow chart of a method performed by the authentication receiver apparatus according to an embodiment of the present invention. This method embodiment is also explained with reference to the exemplary authentication transmitter apparatus 20 and authentication receiver apparatus 40 shown in FIG. 1. The method is also applied to the authentication transmitter apparatus 220 and receiver apparatus 240 shown in FIG. 2. Execution of the method should, however, not be considered limited to these exemplary transmitter and receiver embodiments.

The authentication receiver apparatus 40 may receive a table 70 with a signature 72 from the authentication transmitter apparatus 20. The signed table 70 and its signature 72 are input to a verification function 74, together with a public key 76 that is associated with the private key 66. If the signed table 70 is successfully verified, a verified table 80 is created with the verified hashed messages or HIDs. If the table is not successfully verified, then the authentication receiver apparatus 40 must wait until it receives a new signed table 70. The authentication receiver apparatus 40 may be provisioned beforehand with the public key 76 associated with the private key 66 that was used by the authentication transmitter apparatus 20.

The authentication receiver apparatus 40 is further configured to receive a plurality of navigation messages 52 directly from the plurality of GNSS satellites 10. The GNSS satellites 10 broadcast their navigation messages at specific moments in time to all possible receivers located within their area of visibility. To allow authentication, the GNSS messages 52 received by the authentication receiver 40 should form all or a subset of the GNSS messages 50 received by the authentication transmitter apparatus 20.

The authentication receiver apparatus 40 may be configured to execute the same type of hashing and truncating functions as the ones that are used by the authentication transmitter apparatus 20. Consequently, the authentication receiver apparatus 40 may apply a further hash function 84 and a further truncation function 86 to the GNSS messages 52 received from the plurality of the GNSS satellites 10. The authentication receiver apparatus 40, when hashing and truncating the messages, may thus assign identifying HIDs for each message.

The resulting further hashed messages 92a-h, which may be further truncated hashed messages, may be then added to a further table 90. Subsequently, the authentication receiver apparatus 40 may execute a comparison or matching function 94, wherein the further hashed messages 92 of the further table 90 are compared with the verified hashed messages of the verified table 80. If the matching 94 is successful, then the received GNSS messages 52 may be recognized as trustworthy and they are authenticated. If the matching 94 of the further hashed message 92i versus the verified hashed message i of verified table 80 is not successful, the message 52i cannot be authenticated, and the authentication receiver 40 must wait until the next group of navigation messages 52 or the next signed table 70 is received before the navigation message from the satellite corresponding to the message 52i may be authenticated.

According to an embodiment of the present invention, authentication may be possible only when the messages in the verified table 80 received from the authentication transmitter apparatus 20 match the messages in the table 90 created from the received GNSS navigation messages 52. The authentication receiver apparatus 40 receives, at specific times, navigation messages 52 from a plurality of GNSS satellites 10. Since the authentication transmitter apparatus 20 may know the (approximate) location of the authentication receiver apparatus 40, and also which GNSS satellites are visible for the authentication receiver apparatus 40, the authentication transmitter apparatus 20 may include in the signed table 70 a selection of hashed messages 62 corresponding to navigation messages 50 from those GNSS satellites 10 that are visible to the authentication receiver apparatus 40. When the authentication receiver apparatus 40 receives the navigation messages 52 directly from the GNSS satellites 10, it may perform the hash and truncation functions 84, 86, and the resulting further hashed messages 92 may be added to a further table 90. When the matching operation 94 determines that a message i of verified table 80 matches the corresponding message of further table 90, the message 52i can be considered to be authenticated.

Although FIG. 4 has been described in relation to GNSS navigation messages 50, 52, it should be apparent that a similar mechanism may be applied for augmentation or correction messages 55.

Figure 5:
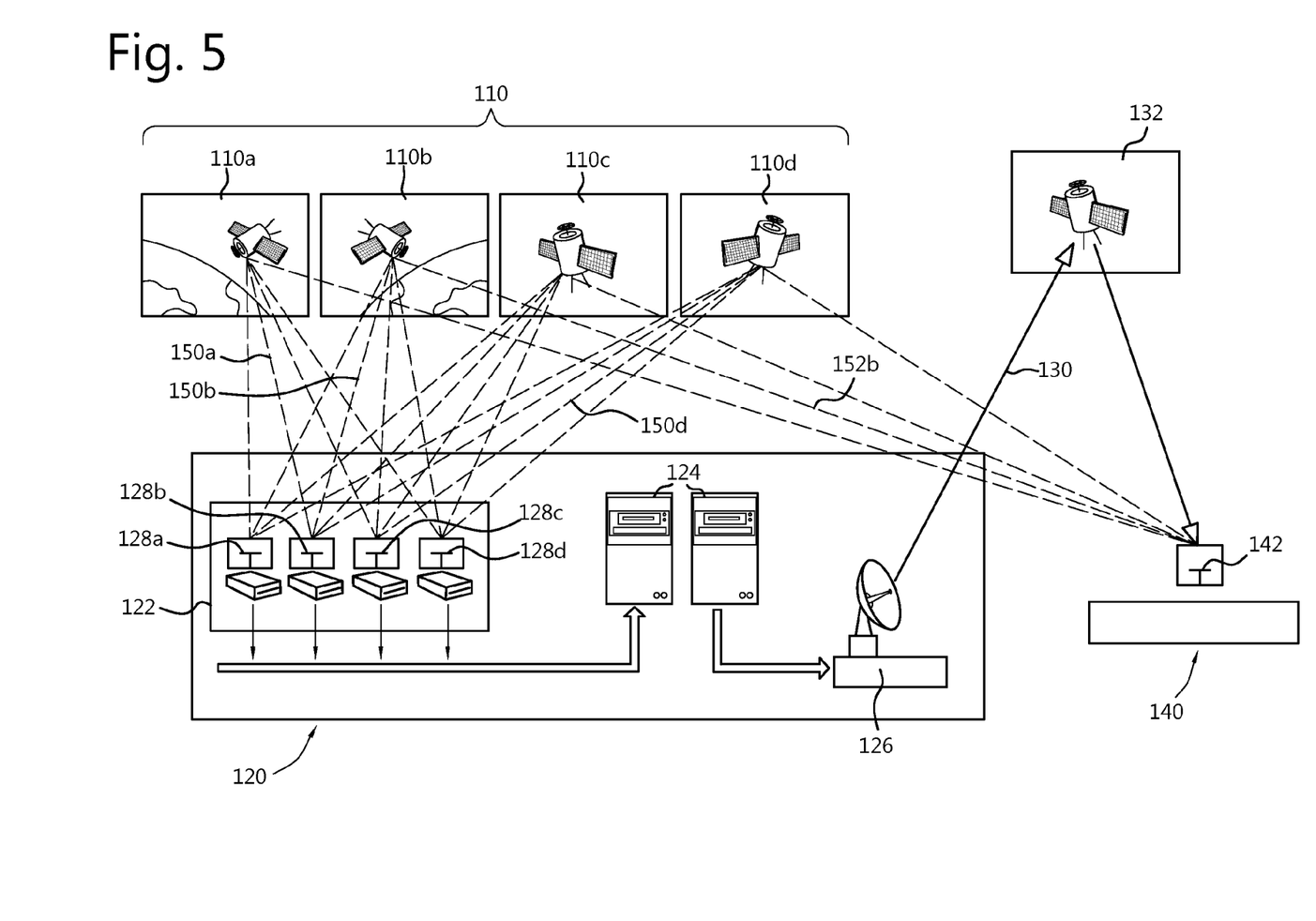
FIG. 5 illustrates a detailed view of a system for authentication of GNSS messages according to an embodiment of the present invention.

FIG. 5 illustrates a detailed view of a system for authentication of GNSS messages according to an embodiment of the present invention. Features in the authentication system that have already been described above with reference to the system embodiment (and in particular FIG. 1) may also be present in the system shown in FIG. 5, and will not all be discussed here again. For the discussion with reference to FIG. 5, like features are designated with similar reference numerals preceded by 100, to distinguish the embodiments.

The authentication transmitter apparatus 120 comprises a reference receiver 122, an authentication server 124, and a transmitting unit 126. The reference receiver 122 may be formed by, connected to or configured to receive information from a network of GNSS receivers 128a-d. This network of receivers 128 may form a spatially distributed network of GNSS receivers with global coverage. According to an embodiment of the present invention, these receivers 128, and consequently the reference receiver 122, may be able to obtain navigation messages 150 from up to hundred twenty or more GNSS satellites 110. According to an embodiment of the present invention, the receivers 128 may also be able to receive correction or augmentation messages from available GNSS systems. As already indicated above, by way of example, if messages are to be received from the GNSS systems GPS, GLONASS, Galileo and BeiDou, the receivers 128 may receive correction messages for all four GNSS systems, wherein the broadcast channel may also be through the GNSS satellites.

The navigation messages 150 received by the receiver 122 (or the correction messages) may then be processed by the authentication server 124, via methods in accordance with the second aspect of the invention, for example by the method embodiment described with reference to FIG. 3.

The server 124 is configured to hash the messages, to truncate the hashed messages, to create a table of truncated hashed messages, to sign the table using a cryptographic algorithm and to concatenate the signature to the signed table. The transmitting unit 126 may then prepare the table and the concatenated signature for transmission.

In this exemplary embodiment, the communication link 130 between the authentication transmitter apparatus 120 and the authentication receiver apparatus 140 may be a geostationary satellite 132 link. However, any other suitable communication link may be also used, such as the internet.

The authentication transmitter apparatus 120 may transmit authentication tables periodically, for all the GNSS messages 150 received, and may transmit the authentication tables via broadcast, so that those receivers wishing to obtain the authentication tables can receive them.

On the receiver side, the authentication receiver apparatus 140 may receive GNSS navigation messages 152 from GNSS satellites 110 and also authentication tables from the authentication transmitter apparatus 120. The authentication receiver apparatus 140 may authenticate the GNSS messages 152 via methods in accordance with the third aspect of the invention, for example by the method embodiment described with reference to FIG. 4.

Although this embodiment has been explained in relation with the navigation messages, it is to be understood that a similar process may occur for the correction messages 55.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. It will be apparent to the person skilled in the art that alternative and equivalent embodiments of the invention can be conceived and reduced to practice. All changes which come within the meaning and range of equivalency of the claims are to be embraced within their scope.

Note that for reasons of conciseness, the reference numbers corresponding to similar elements in the various embodiments (e.g. element 110 being similar to element 10) have been collectively indicated in the claims by their base numbers only i.e. without the multiples of hundreds. However, this does not suggest that the claim elements should be construed as referring only to features corresponding to base numbers. Although the similar reference numbers have been omitted in the claims, their applicability will be apparent from a comparison with the figures.

LIST OF REFERENCE SYMBOLS

Similar reference numbers that have been used in the description to indicate similar elements (but differing only in the hundreds) should be considered implicitly included.

10a-d GNSS satellite
20 authentication transmitter apparatus
24 authentication server
26 transmitting unit
30 authentication transmitter-Authentication receiver link
40 authentication receiver apparatus
50 navigation message received by authentication transmitter apparatus 52 navigation message received by authentication receiver apparatus
54 hash function
55 correction message
56 truncation function
60 unsigned table
62a-h hashed message (e.g. truncated hashed message, HID)
64 signature function
66 private key
68 concatenation and merging function
70 signed table
72 signature
74 verification function
76 public key
80 verified table
84 further hash function
86 further truncation function
90 further table
92 further hashed message (e.g. further truncated hashed message)
94 match function
122 reference network
128a-d GNSS receiver
132 Satellite link (e.g. geostationary satellite)
142 further GNSS receiver
210 correction augmentation server

The invention claimed is:

1. A method for authentication of global navigation satellite system (GNSS) messages by an authentication transmitter apparatus comprising at least one reference receiver, an authentication server, and an authentication transmitter, the method comprising:
receiving, by the at least one reference receiver, a plurality of navigation messages from a plurality of GNSS satellites;
validating the navigation messages by checking that a received navigation message allegedly coming from a specific GNSS satellite is identical at all or most of the GNSS receivers from the global network of GNSS receivers;
hashing, by the authentication server, the navigation messages to create a plurality of hashed messages;
creating, by the authentication server, a table comprising the plurality of hashed messages;
signing, by the authentication server, the table to create a signed table comprising the hashed messages and a cryptographic signature; and
transmitting, by the authentication transmitter, the signed table to an authentication receiver apparatus.

2. The method according to claim 1, wherein the at least one reference receiver is in signal communication with and/or formed by a global network of GNSS receivers that are configured to receive the navigation messages from the plurality of GNSS satellites.

3. The method according to claim 1, wherein transmitting the signed table involves transmission via at least one geostationary satellite.

4. The method according to claim 3, wherein the authentication receiver apparatus is located within the field of coverage of the geostationary satellite.

5. The method according to claim 1, further comprising:
receiving a plurality of GNSS correction messages from at least one correction augmentation server;
hashing, by the authentication server, the correction messages to create a plurality of hashed messages;
creating, by the authentication server, a table comprising the plurality of hashed messages;
signing, by the authentication server, the table to create a signed table comprising the hashed messages and a cryptographic signature, and
transmitting, by the authentication transmitter, the signed table to an authentication receiver apparatus.

6. The method according to claim 1, further comprising truncating the hashed messages so that the hashed messages in the signed table are truncated hashed messages.

7. The method according to claim 6, wherein the size of the truncated hashed messages is between 50 and 70 bits.

8. The method according to claim 1, wherein the cryptographic signature is implemented with a private key using an asymmetric cryptographic algorithm.

9. An authentication transmitter apparatus for authentication of global navigation satellite system (GNSS) messages, the apparatus comprising:
at least one reference receiver configured to receive a plurality of navigation messages from a plurality of GNSS satellites;
an authentication server configured to validate the navigation messages by checking that a received navigation message allegedly coming from a specific GNSS satellite is identical at all or most of the GNSS receivers from the global network of GNSS receivers, and hash the navigation messages, to create a table with the plurality of hashed messages, and to sign the table using a cryptographic signature to create a signed table with the hashed messages and the signature; and
an authentication transmitter configured to transmit the signed table to an authentication receiver apparatus.

10. The apparatus according to claim 9, wherein the at least one reference receiver is in signal communication with and/or formed by a global network of GNSS receivers that are configured to receive the navigation messages from the plurality of GNSS satellites.

11. The apparatus according to claim 9, wherein transmitting the signed table involves transmission via at least one geostationary satellite.

12. The apparatus according to claim 11, wherein the authentication receiver apparatus is located within the field of coverage of the geostationary satellite.

13. The apparatus according to claim 9, wherein,
the at least one reference receiver is further configured to receive a plurality of GNSS correction messages from at least one correction augmentation server,
the authentication server is further configured to hash the correction messages to create a plurality of hashed messages, create a table comprising the plurality of hashed messages, sign the table to create a signed table comprising the hashed messages and a cryptographic signature, and
the authentication transmitter is further configured to transmit the signed table to an authentication receiver apparatus.

14. The apparatus according to claim 9, wherein authentication server is configured to truncate the hashed messages so that the hashed messages in the signed table are truncated hashed messages.

15. The apparatus according to claim 14, wherein the size of the truncated hashed messages is between 50 and 70 bits.

16. The apparatus according to claim 1, wherein the cryptographic signature is implemented with a private key using an asymmetric cryptographic algorithm.

17. A non-transitory computer-readable medium storing instructions, which when executed by at least one processor, causes the at least one processor to:

receive a plurality of navigation messages from a plurality of GNSS satellites;

validate the navigation messages by checking that a received navigation message allegedly coming from a specific GNSS satellite is identical at all or most of GNSS receivers from a global network of GNSS receivers;

hash the navigation messages to create a plurality of hashed messages;

create a table comprising the plurality of hashed messages;

sign the table to create a signed table comprising the hashed messages and a cryptographic signature; and transmit the signed table to an authentication receiver apparatus.

18. The non-transitory computer-readable medium according to claim 17, wherein transmitting the signed table involves transmission via at least one geostationary satellite.

19. The non-transitory computer-readable medium according to claim 17, further comprising instructions which when executed by the at least one processor, causes the at least one processor to:

receive a plurality of GNSS correction messages from at least one correction augmentation server;

hash the correction messages to create a plurality of hashed messages;

create a table comprising the plurality of hashed messages;

sign the table to create a signed table comprising the hashed messages and a cryptographic signature, and transmit the signed table to an authentication receiver apparatus.

20. The non-transitory computer-readable medium according to claim 17, further comprising instructions which when executed by the at least one processor, causes the at least one processor to truncate the hashed messages so that the hashed messages in the signed table are truncated hashed messages.

* * * * *